United States Patent [19]

Okabayashi

[11] Patent Number: 4,539,079

[45] Date of Patent: Sep. 3, 1985

[54] METHOD AND APPARATUS FOR ELECTROFORMING A STAMPER FOR PRODUCING A HIGH-DENSITY INFORMATION RECORDING CARRIER

[75] Inventor: Norio Okabayashi, Himeji, Japan

[73] Assignee: Daicel Chemical Industries, Ltd., Sakai, Japan

[21] Appl. No.: 628,369

[22] Filed: Jul. 6, 1984

[30] Foreign Application Priority Data

Jul. 6, 1983 [JP] Japan .................................. 58-121690

[51] Int. Cl.³ ........................ C25D 1/10; C25D 21/10; C25D 21/12
[52] U.S. Cl. ...................................... 204/5; 204/212; 204/275
[58] Field of Search .................... 204/5, DIG. 7, 212, 204/275, 276

[56] References Cited

U.S. PATENT DOCUMENTS

| | | | |
|---|---|---|---|
| 2,751,345 | 6/1956 | Osman | 204/5 |
| 4,359,375 | 11/1982 | Smith | 204/212 |
| 4,391,694 | 7/1983 | Runsten | 204/275 |
| 4,415,423 | 11/1983 | Brooks | 204/212 |
| 4,435,266 | 3/1984 | Johnston | 204/276 |
| 4,447,307 | 5/1984 | Davis | 204/DIG. 7 |

FOREIGN PATENT DOCUMENTS 51-43209  10/1976  Japan ................................ 204/276

*Primary Examiner*—Thomas Tufariello
*Attorney, Agent, or Firm*—Armstrong, Nikaido, Marmelstein & Kubovcik

[57] ABSTRACT

Method and apparatus for producing a desired thickness distribution on a stamping plate in a rotary electroforming process. The stamping plate is used to produce a high density information recording carrier. A shielding plate is detachably mounted adjacent a fixed anode in an electrochemical bath. Another shielding plate is detachably mounted adjacent the rotary cathode. During electroforming either or both shielding plates are put into position or removed at appropriate times to produce the desired thickness distribution.

4 Claims, 16 Drawing Figures

METHOD AND APPARATUS FOR ELECTROFORMING A STAMPER FOR PRODUCING A HIGH-DENSITY INFORMATION RECORDING CARRIER

BACKGROUND OF THE INVENTION

The present invention relates to a method of electroforming a stamper to be used for forming or replicating a plastic disc, particularly a high-density information recording disc such as a video disc or a digital audio disc, and an apparatus for use with electroforming thereof.

The plastic disc to be used in a system for recording information signals in the form of submicron-order unevenness or pits on the plastic disc, reading the pits in an optical manner and playing back the same is mainly produced by techniques of compression molding, sheet molding, 2P (photo-polymerization) method and injection molding. In any such molding processes, a high degree of accuracy is required of a mold or a stamper to be used for transferring the submicron order pits onto plastic materials.

The stamper is generally produced by an electroforming technique as described in the following. A resist or a thin film of metal or the like is formed on a glass plate which has an optically completely flat surface. The resist is cut by a laser or the like to form pits or tracking grooves according to information signals. Such an original glass plate as above obtained as a mother die is electroformed to obtain a so-called master plate on which the pits are inversely transferred. Because the original plate normally has no electroconductivity, an electro conductive thin film is formed on the original plate by silver mirror reaction, vacuum deposition, sputtering or the like at the start of the electroforming of the master plate, and then a nickel-electroforming process is carried out. Information signals on the original plate are directly replicated on a plastic disc by using the master plate as the stamper when the plastic disc is molded. The depth of the signal pits may be generally set to $\frac{1}{2}n$ (n is a positive integer) of a wave length of a reading laser beam. However, since the surface of the master plate is a coating of above-mentioned electroconductive layer, and it sometimes does not have enough strength sufficient to endure repeated use in molding, a peeling treatment of the master plate is used to obtain a so-called mother plate having an inversed unevenness thereon. Then the mother plate is treated by peeling electroformed, thus obtaining the stamper.

The stamper is required to have certain characteristics such as a uniformity of thickness in addition to a superior transferability and mechanical strength. Ununiformity of thickness of the stamper directly affects ununiformity of thickness of the plastic disc to be molded, thus resulting in hindrance to a device for optically reading the disc. Further, such an ununiformity of thickness causes a metal mold to be damaged. A normal thickness of the stamper is in the range of 0.2–0.5 mm, and the permissable error is within 5% thereof.

To obtain such a nickel stamper, the original plate is normally mounted on an inclined rotary disc and is disposed in opposed relation with a nickel anode box or bag. Then, it is immersed in an electrodeposition solution containing nickel sulfamate as a main component. Direct current is conducted to the solution with stirring, thus accomplishing electroforming.

Generally, in case of a disc-like original plate, a peripheral portion of the disc tends to become relatively thicker, resulting in influence to uniformity of thickness. This is considered to be due to the fact that a difference in current density is created between a central portion of the mother disc and an outer portion thereof in dependence on the conditions of rotation of the mother disc and diffusion of circulating liquid. Accordingly, in such a case as above, in order to render uniform the thickness of a nickel layer to be formed by electrodeposition to the original disc, shape or size of an opening of the anode box or bag is generally adjusted and empirically set for the conditions to obtain an optimum uniformity of thickness in dependence upon an outer diameter of the original disc and the size of a central opening. In other words, conventionally the thickness of the stamper is adjusted by designing a shape of a shielding plate relative to an opening on the anode side to adjust the thickness of electroforming. However, since there exists a distance between an anode and a cathode, a shielding effect is not satisfactorily exhibited irrespective of provision of the shielding plate on the anode side, thus hindering an appropriate change in the thickness of electroforming. Further, if a large-sized shielding plate is used for increasing a shielding effect, current efficiency is disadvantageously decreased.

OBJECTS AND SUMMARY OF THE INVENTION

In order to overcome the above-mentioned defects in the prior art, the present inventors have studied and developed a method of making uniform the thickness distribution in a radial direction of a stamper. That is, the thickness distribution in the radial direction may be controlled to an appropriate value as desired by using this method.

In general, the thickness of the stamper to be used for molding a high-density information recording carrier such as a video disc or a digital audio disc must be uniform. Particularly, there has been recently a requirement for a stamper having an inclined thickness distribution in a radial direction in dependence upon a molding method or molding conditions. For instance, in case of injection molding, molten resin must be rapidly filled into a disc-like molding cavity having a thickness of 1.2 mm and a radius of 15 cm, where it is desired to provide a slight gradient for the thickness in a radial direction of the stamper.

Accordingly, it is an object of the present invention to provide a method of electroforming a stamper, whereby a thickness distribution in a radial direction of the stamper may be controlled to an appropriate value.

It is another object of the present invention to provide a method of electroforming a stamper, whereby a thickness distribution in a radial direction of the stamper may be made uniform.

It is a further object of the present invention to provide an apparatus for embodying the electroforming method as mentioned above.

The method of electroforming a stamper according to the present invention is characterized in that each shielding plate is detachably mounted on an anode side and a cathode side, whereby a thickness of a portion near a central portion of the stamper is adjusted by the shielding plate mounted on the anode side, while a thickness of a portion near an outer peripheral portion of the stamper being adjusted by the shielding plate mounted on the cathode side. Both the shielding plates are mounted or demounted during a period of time from the start of an electroforming process to the end thereof, thereby controlling a thickness distribution in a radial direction of the stamper to an appropriate value as desired.

In one specific embodiment of the present invention, a shielding ring is detachably arranged in the vicinity of a cathode fixed to an original disc. The shielding ring is removed during the electroforming, thereby producing a stamper having a uniform thickness distribution in a radial direction.

The above-mentioned shielding ring may be detachably mounted to a rotary cathode so as to rotate integrally therewith, or may be insertably fixed to a portion near the rotary cathode.

The present invention is also directed to an electroforming apparatus for embodying the above-mentioned electroforming method. The apparatus is characterized in that each separate shielding plate is detachably arranged on the anode and the cathode.

DETAILED DESCRIPTION OF THE INVENTION

Figure 1:
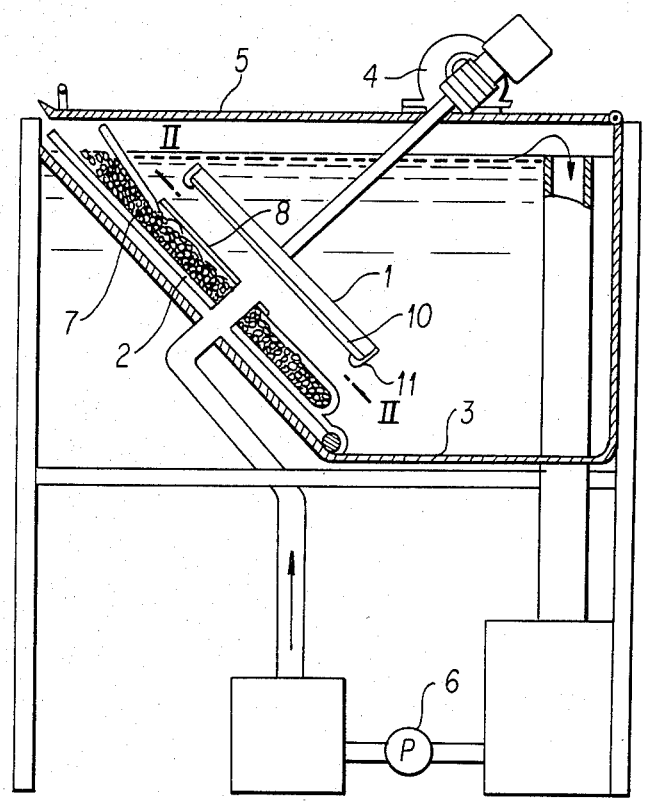
FIG. 1 is a schematic partially sectional side view of an inclined rotary electroforming in the prior art.
Figure 2A:
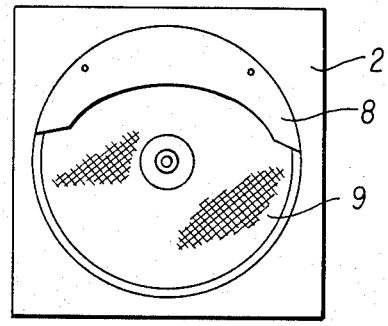
FIGS. 2A and 2B are plan views of the anode side and the cathode side, respectively as viewed from the plane II—II in FIG. 1.

Now, the present invention will be described with reference to attached drawings in the following manner. First, the constitution of an inclined rotary disc type conventional electroforming apparatus is explained by using FIGS. 1 and 2. FIG. 1 is a schematic partially sectional view of the electroforming apparatus of the inclined rotary disc type which apparatus is generally used for electroforming of the stamper. An original disc 10 is fixed to a cathode 1 by a holder 11. The cathode 1 is designed to be rotated by a motor 4, and is retained at an angle of 45 relative to a vertical plane. An anode opposed to the cathode 1 is in the form of an anode box 2. The anode box 2 is designed to be taken out of an electroforming cell 3, and accommodates electroforming material such as nickel balls therein. An electroforming solution is circulated by a pump 6. The drawing schematically shows the situation where the electroforming solution is supplied through a center of the anode holder to a cathode surface. An opening 9 is formed on the surface of the anode holder 2 opposed to the cathode 1. The opening 9 is covered with a filter cloth, and thereby is designed to allow ions to pass therethrough, but to filter sludge created at the electrode, wherein Ni ions are allowed to diffuse through the opening 9 toward the cathode. A part of the opening 9 is covered with a shielding plate 8 of a suitable form. In FIGS. 1 and 2A, a lunate shielding plate 8 is shown.

In such a conventional electroforming apparatus as described above, it is possible to adjust the electroforming thickness in a radial direction to some extent by changing the shape of the shielding plate 8, the distance between the cathode and the anode, and the circulating speed of the electroforming solution. However, it is impossible to adjust the thickness distribution in a radial direction to a desired value, and in particular, it is impossible to make it uniform by using only the shielding plate 8 provided on the anode side as shown in FIG. 1.

The present invention is intended to eliminate the above-mentioned defects, and will be described below by using FIGS. 3 to 8.

Figure 2B:
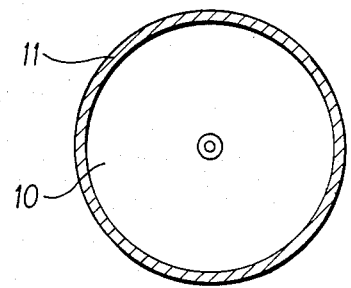
Figure 3:
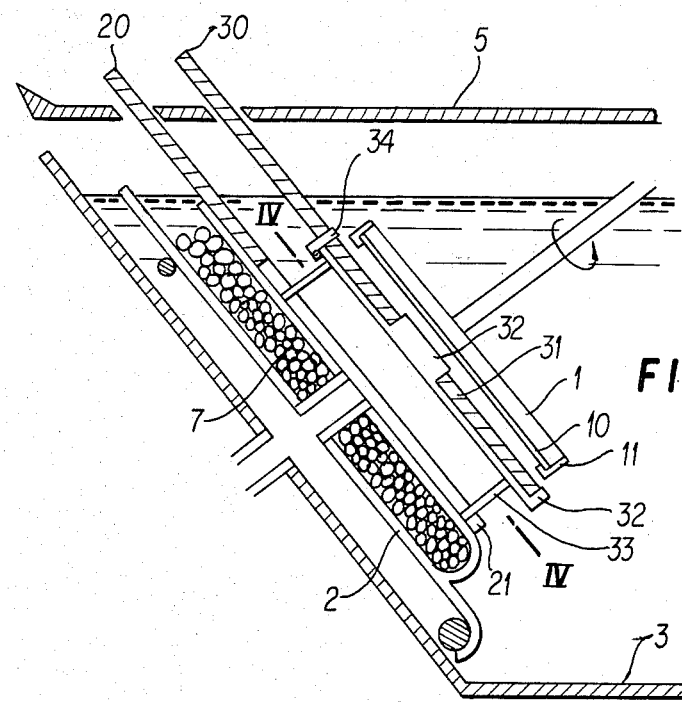
FIG. 3 is a schematic partially sectional side view of the essential part of the inclined rotary electroforming apparatus of one embodiment of the present invention, similar to FIG. 1.
Figure 4A:
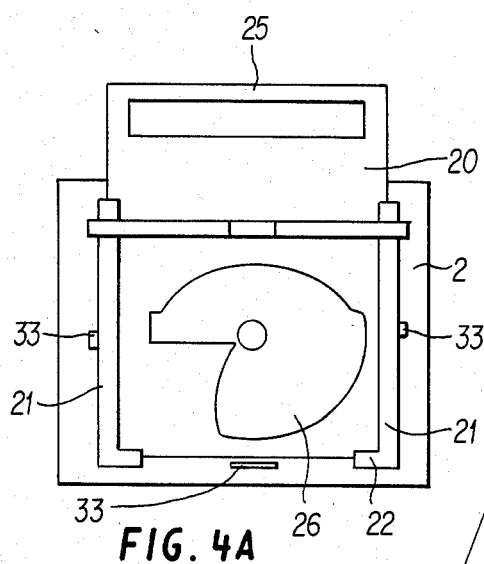
FIGS. 4A and 4B are plan views of the anode side and the cathode side, respectively as viewed from the plane IV—IV in FIG. 3.
Figure 4B:
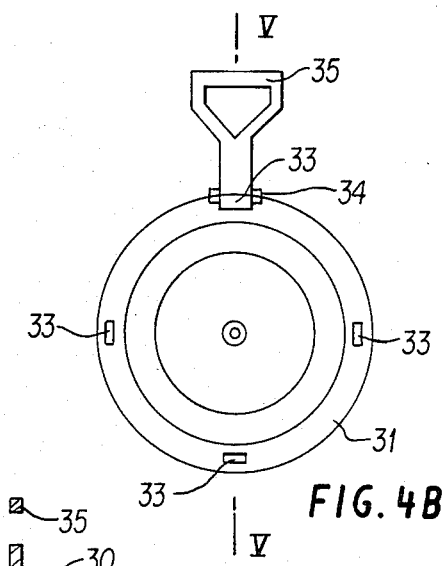
Figure 5:
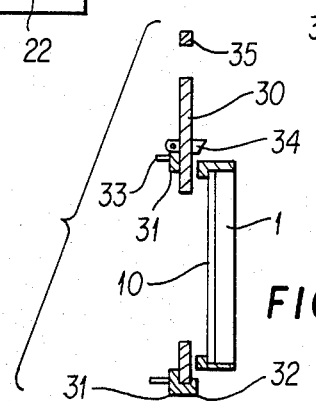
FIG. 5 is a sectional view taken along the line V—V in FIG. 4B.
Figure 6A:
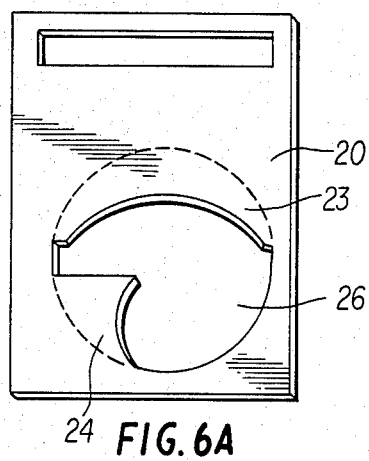
FIGS. 6A and 6B are perspective views of each shielding plate on the anode side and the cathode side as used with the apparatus in FIGS. 3 and 4.

Referring to FIG. 3, an inclined rotary electroforming apparatus as shown in the drawing is basically the same as the conventional electroforming apparatus as shown in FIGS. 1 and 2, except that a shielding plate 20 on the anode side and a shielding plate 30 on the cathode side are detachably arranged. The shielding plate 20 on the anode side as shown in FIG. 3 is designed to slide on the surface of the anode box 2 along two parallel guide rails 21 mounted on the surface of the anode box 2 to a stopper 22, and is allowed to be drawn out of an electroforming cell 3 by grasping a handle 25 from above a lid 5 of the electroforming cell 3 through a slit formed on the lid 5. As shown in FIG. 6A, the shielding plate 20 on the anode side is formed with an opening 26 having two sectors 23 and 24 which partially cover an outer peripheral portion of a phantom circle corresponding to the opening 9 of the anode box. In other words, the anode is covered with the sectors 23 and 24 at the area except the opening 26. Although the opening 26 is in the form of circle covered with both the sector 23 and 24 in the drawing, the opening may be formed in an appropriate shape such as star, ellipse, square, rectangle, cross and the like. Accordingly, if many kinds of shielding plates having various opening shapes are ready to be used, a desired shielding plate may be used by exchanging the same with each other.

According to the feature of the present invention, there is also detachably mounted a shielding plate 30 on the cathode 1 side. The shielding plate 30 on the cathode side is designed to be set on a support ring 31 fixed to four support columns 33 projecting from the surface of the anode box 2. In other words, the shielding plate 30 may be set at a certain position by three guides 32 formed by the support ring 31 and a rotatable hook 34 disposed at the uppermost position. Upon insertion or drawing out of the shielding plate 30 on the cathode side, the plate 30 may be inserted or drawn out by removing the rotatable hook 34. The diameter and the width of the support ring 31 are set to a suitable value such that the surface of the cathode is not covered with the support ring 31. (See FIG. 5.)

Figure 6B:
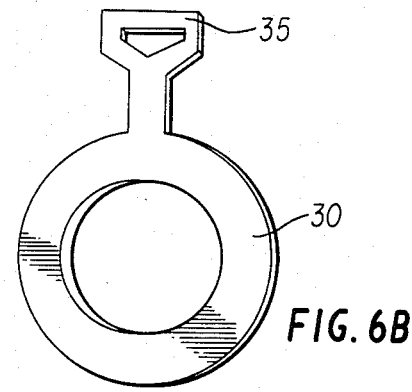

As shown in FIG. 6B, the shielding plate 30 on the cathode side may be constituted of a ring and a handle 35 formed integrally with the ring. Upon insertion or drawing out of the shielding plate 30, the plate 30 is operated by grasping the handle 35 projecting from a slit formed on the lid of the electroforming cell. Further, an opening shape of the shielding plate 30 may be related from any appropriate shapes such as real circle, ellipse, star and the like.

Further, the support means for the shielding plates 20 and 30 as shown in FIGS. 3 to 6 is only an example, and it will be readily understood that any other appropriate positionable mechanisms may be applicable. For example, the support means may be supported by the electroforming cell 3 in substitution for the anode box.

Figure 7:
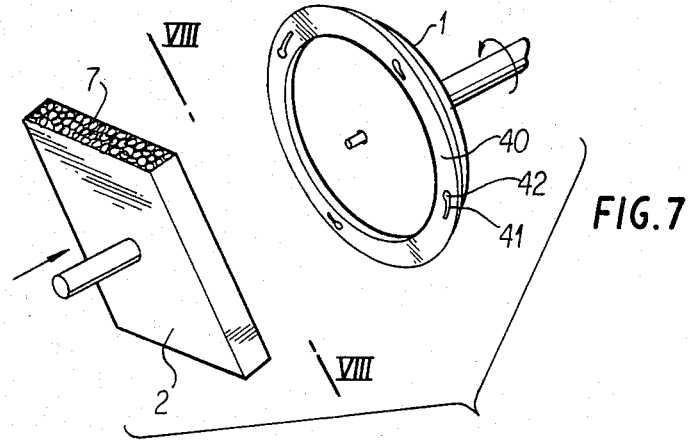
FIG. 7 is a perspective view of the essential part of the rotary electroforming apparatus of another embodiment of the present invention, similar to the apparatus in FIG. 3 except that the shielding plate on the cathode side is detachably mounted to the rotary cathode.
Figure 8A:
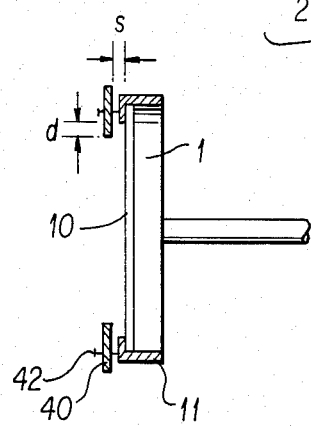
FIG. 8A is a sectional side view of the cathode shown in FIG. 7.
Figure 8B:
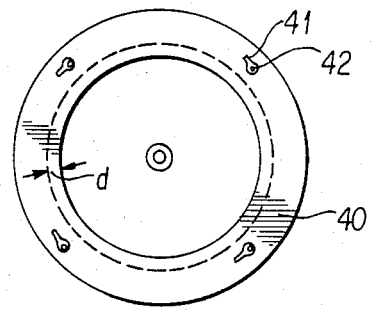
FIG. 8B is a plan view of the cathode side as viewed from the plane VIII—VIII in FIG. 7.

FIGS. 7 and 8 show another embodiment, wherein a shielding plate 40 on the cathode side is detachably mounted to the rotary cathode 1, and more precisely through an acrylic holder 11 to the rotary cathode 1. In other words, the shielding plate 40 on the cathode side in this embodiment is in the form of a shielding ring. The shielding ring 40 is formed with a plurality of holes 41 (four holes in the drawing) constituted of large diametrical holes and elongated holes. Pins 42 projecting from the cathode 1 are designed to be engaged with the holes 41. The pins 42 include larger diametrical head portions. It will be understood that the shielding ring 40 may be fixed to the cathode 1 by inserting the head portions of the pins 42 into the large diametrical holes of the shielding ring 40, and then slightly rotating the shielding ring 40 in its circumferential direction to engage the pins 42 with the elongated holes of the shielding ring 40.

Although the shielding plate 30 on the cathode side according to the previous embodiment as shown in FIGS. 3 to 6 may be drawn out with the electroforming cell covered with the lid 5, according to the embodiment as shown in FIGS. 7 and 8, the shielding ring 40 is manually removed by opening the lid 5 and then taking out the cathode 1 from the electroforming cell. In the embodiment as shown in FIGS. 7 and 8, it is impossible to use any other shielding rings having an elliptic and a star central opening than the shielding ring 40 having a circular central opening as shown in the drawings.

An example of the present invention will be described as follows:

EXAMPLE

On an optically flat glass disc having a diameter of 350 mm, a central opening diameter of 7.2 mm, and a thickness of 6 mm, a resist having a thickness of 0.2 was coated. Then, a series of pits on a spiral track of 1 micron width are cut by a laser beam which is modulated to PCM signal to produce an original disc. A gold conductive layer having a thickness of 150A was formed by vacuum deposition on the original disc. The original disc was immersed in an electroforming solution, and was rotated under the condition at angle of 45 relative to a vertical plane. An electrodeposition surface was arranged in opposed relation with an anode box with the distance therebetween retained to 7 cm. In such circumstances, electroforming process was carried out. Composition of an electroforming bath is as follows:

Nickel sulfamate (four hydrates)—400 g/l
Nickel chloride (six hydrates)—5 g/l
Boric acid—30 g/l
Pit inhibitor—0.5 g/l Temperature of the bath was 50 C. The liquid was circulated and passed through a reservoir including a membrane filter of 0.4 at a cycle of 10 times per hour, so that the liquid was delivered to the central portion of the original disc. An corrugated cathode and an anode bag for electrolytic nickel were immersed in the reservoir, and weak current of 0.3 a.dm$^2$ was conducted to selectively electrodeposit any impurity ions $Ca^{2+}$, $Fe^{3+}$, $Zn^{2+}$, $Pb^{2+}$, etc. and thereby to purify the electroforming bath.

Pallets of electrolytic nickel were used for the anode nickel.

Figure 9:
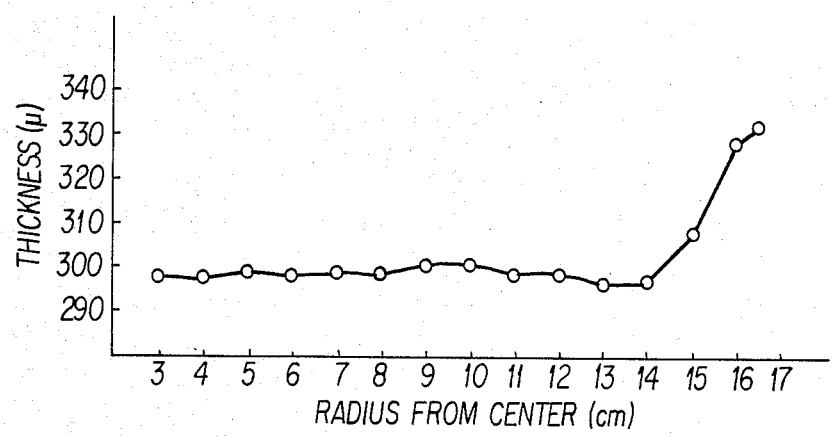
FIGS. 9 to 12 show thickness distributions wherein thickness of the electroformed stamper is plotted relative to radius of the stamper, FIG. 9 showing a conventional example, FIG. 10 showing a distribution of one embodiment utilizing the apparatus of the present invention, and FIGS. 11 and 12 showing a distribution of two other embodiments employing the method of the present invention respectively.

First, by using the conventional apparatus as shown in FIGS. 1 and 2, electroforming was carried out with the total current of 215 A hrs. FIG. 9 shows a thickness distribution in a radial direction of a stamper as obtained above. As will be apparent from FIG. 9, a shielding effect at the outer peripheral portion of the stamper is not attained by using only a lunate shielding plate.

Next, an embodiment using the apparatus as shown in FIG. 3 according to the present invention will be described in the following manner.

Figure 10:
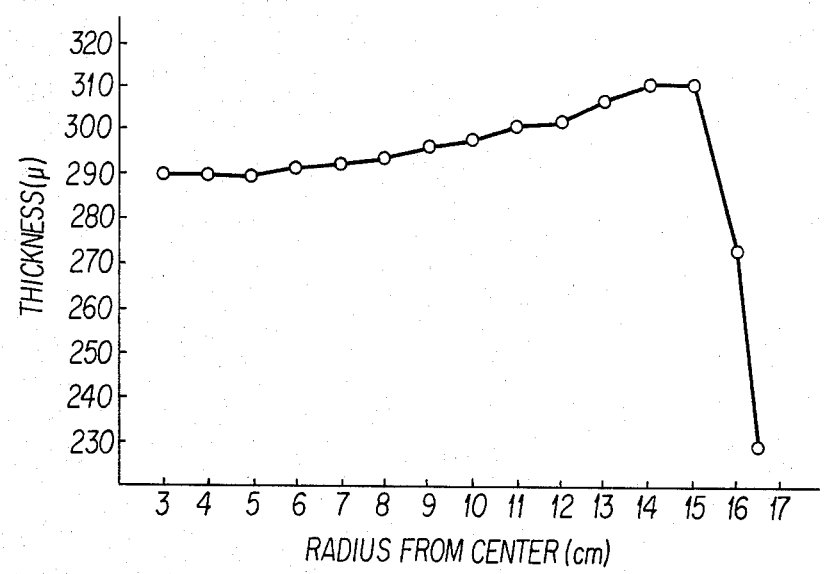

As a shielding plate on the anode side of the apparatus as shown in FIG. 3, the shielding plate 20 as shown in FIG. 6A was used, including the lunate sector 23 only, but excluding the fan-shaped sector 24. As a shielding plate on the cathode side, the shielding ring 30 as shown in FIG. 6B was mounted upon start of the electroforming process. The electroforming was carried out with the total current of 215 A hrs without removing the shielding ring 30 until the electroforming process was over. FIG. 10 shows the result of the electroforming as above described. As is apparent from FIG. 10, a shielding effect to the outer peripheral portion of the stamper is remarkably improved by using the shielding ring 30 on the cathode side.

This stamper may be utilized as a small diametrical disc forming stamper having a gentle-sloped thickness distribution in a radial direction, by cutting out the counter peripheral portion of the stamper.

Next, there will be described another embodiment wherein the shielding plate is detached during the electroforming process in the present invention.

Figure 11:
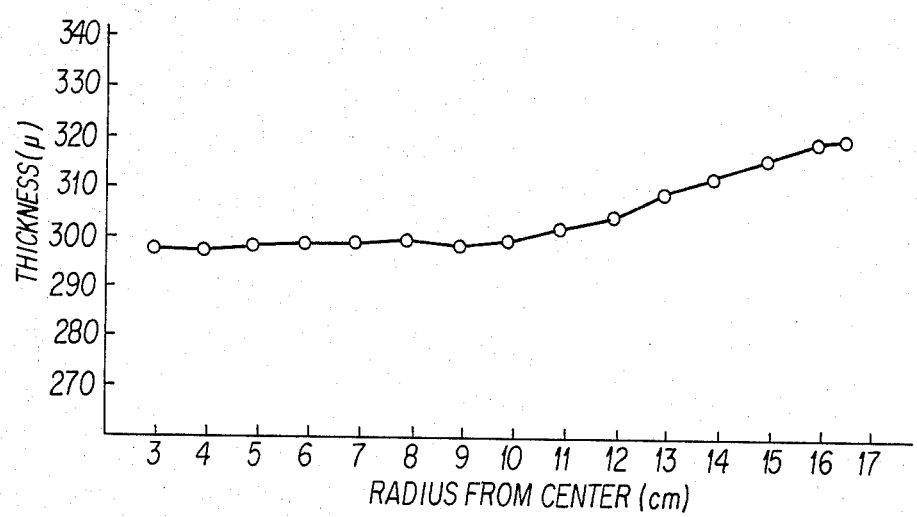

On starting the electroforming process with the apparatus as shown in FIG. 3, the shielding plate on the anode side without the presence of a shielding plate on the cathode side. The electroforming was carried out with the total current of 215 A hrs, and at the time corresponding to the current quantity of 120 A hrs, the shielding plate 20 on the anode side was removed and substantially the shielding plate 30 on the cathode side was inserted. The stamper as obtained in this embodiment included a gentle gradient of thickness distribution in a radial direction toward the outer circumference of the stamper as is apparent from FIG. 11.

This stamper especially shows the effect when it is mounted to a metal mold for injection-molding molten resin through a flash gate provided at an outer circumference of an annular molding cavity into the cavity. Such an injection molding process is disclosed as to constitution, advantage and the like in Japanese patent application No. 58-126183 filed by the present applicant.

Figure 12:
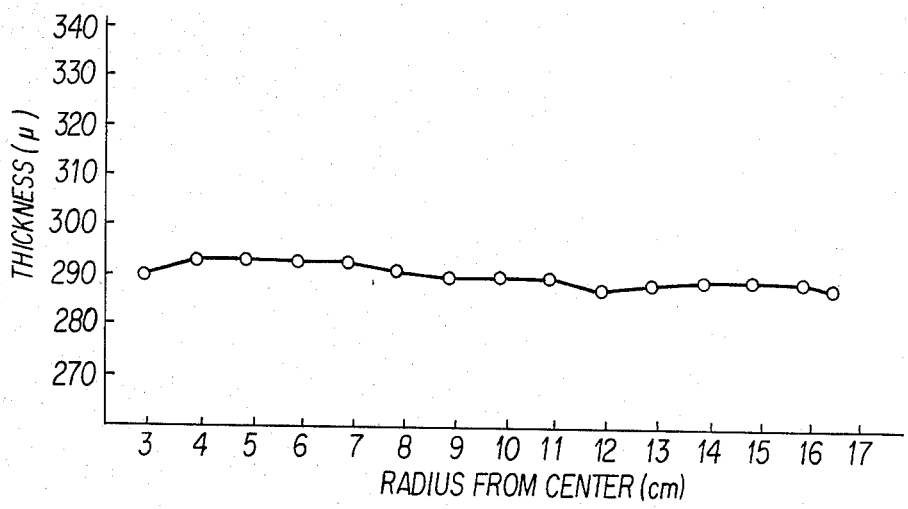

In a still further embodiment, the electroforming process was carried out by using the apparatus as shown in FIG. 3, wherein the shielding plate on the anode side as shown in FIG. 6A was used as a shielding plate on the anode side, and the shielding ring 30 as shown in FIG. 6B was used as a shielding plate on the cathode side, with the total current quantity of 215 A hrs. At the time corresponding to the current quantity of 65 A hrs, the shielding plate 30 on the cathode side was removed. The result of the embodiment is shown in FIG. 12. As is apparent from FIG. 12, it has been possible to make substantially uniform the thickness distribution in a radial direction of the stamper, by removing the shielding ring 30 on the cathode side during the electroforming process. The same result may be attained by using the shielding ring 40 on the cathode side as shown in FIGS. 7 and 8, and removing same during the electroforming process.

The result in FIG. 12 corresponds to the case where the difference (d) in inner diameters of the acrylic stamper holder 11 and the shielding ring 30 or 40 (See FIG. 8A.) is set to 5 mm, and the clearance (s) between the surface of the original disc and the back surface of the shielding ring is set to 1 cm.

When molten resin is injected from the center of the stamper in its radial direction in the disc-like molten cavity as disclosed in Japenese Patent Laid-Open Patent Appln. No. 56-139940, by using the stamper as mentioned above, it is possible to mold a disc having a uniform thickness.

Although the shielding plate is mounted upon start of the electroforming process and is removed during the electroforming process in the previous embodiment, it will be understood that the order of steps of the electroforming process may be reversed, that is, the shielding plate may be not mounted upon start of the electroforming process, but rather, be inserted during the electroforming process, whereby substantially the same effect may be attained. In general, it is apparent that the shielding effect is enhanced by approaching the shielding plate to the cathode, however, it is impossible to appropriately control the thickness distribution in a radial direction if the shielding plate is kept in mount. Accordingly, the present invention may appropriately control the thickness distribution as mentioned above by independently inserting or removing the shielding plates.

As is above described, according to the present invention, each independent shielding plate is detachably provided on the anode side and the cathode side, and is inserted or removed at an appropriate time during start to end of the electroforming process, thereby to set to a desired value the thickness distribution in a radial direction of the stamper. Especially, in the case that a uniform thickness distribution is required, the shielding plate on the cathode side having a remarkable shielding effect to the outer peripheral portion of the stamper may be removed or inserted during the electroforming process, thereby to obtain a stamper having a remarkably uniform thickness. Further, it is generally possible to produce a stamper having a desired thickness distribution in a radial direction in accordance with molding conditions and injection directions of resin to a mold cavity of a metal mold.

Having described specific embodiments of the present invention, it is obvious that the present invention should not be limited to the specific embodiments.

What is claimed is:

1. A method for electroforming a stamper for producing a high-density information recording carrier by using a rotary electroforming apparatus having a fixed anode and a rotary cathode, the steps comprising removably mounting a shielding plate on the anode side of a clearance between said anode and said cathode, removably mounting a shielding plate on the cathode side of said clearance and, while electroforming a stamper in said apparatus is in progress, removing at least one of said removably mounted shielding plates thereby controlling the electroformed thickness distribution along a radial direction of the stamper to a desired value.

2. The method for electroforming a stamper, as defined in claim 1, wherein said removably mounted shielding plate on the anode side of said clearance is removed after partial electroforming of said stamper.

3. An apparatus for electroforming a stamper for producing a high-density information recording disc-including a fixed anode and a rotary cathode having a clearance therebetween, a shielding plate removably mounted on the anode side of said clearance for removal while electroforming is in progress and a shielding plate removably mounted on the cathode side of said clearance for removal while electroforming is in progress.

4. The electroforming apparatus, as defined in claim 3, wherein said removably mounted shielding plate on the cathode side of said clearance consists of a shield ring having a real circle opening and being removably mounted to rotate integrally with said rotary cathode.

* * * * *